United States Patent [19]

Scheurenbrand et al.

[11] Patent Number: 5,165,561
[45] Date of Patent: Nov. 24, 1992

[54] FUEL LOCK FOR FUEL TANK VENTING ARRANGEMENT

[75] Inventors: Dieter Scheurenbrand, Wolfschlugen; Peter Weymann, Stuttgart; Wolfgang Freiwald, Aichwald, all of Fed. Rep. of Germany

[73] Assignee: Mercedes-Benz AG, Fed. Rep. of Germany

[21] Appl. No.: 846,332

[22] Filed: Mar. 6, 1992

[30] Foreign Application Priority Data

Mar. 6, 1991 [DE] Fed. Rep. of Germany ....... 4107184

[51] Int. Cl.$^5$ .............................................. B65D 90/28
[52] U.S. Cl. ..................................... 220/746; 220/564
[58] Field of Search .............. 220/562, 563, 564, 746, 220/745, 747, 748, 749, 750

[56] References Cited

U.S. PATENT DOCUMENTS

| | | |
|---|---|---|
| 4,531,653 | 7/1985 | Sakata .................... 220/746 |
| 4,572,394 | 2/1986 | Tanahashi et al. ............. 220/746 |
| 4,700,864 | 10/1987 | Gaugs et al. ................. 220/746 |
| 4,821,908 | 4/1989 | Yost ....................... 220/746 |
| 4,874,020 | 10/1989 | Bucce ...................... 220/746 |
| 4,981,153 | 1/1991 | Perkins .................... 220/746 |

FOREIGN PATENT DOCUMENTS 3121621 12/1982 Fed. Rep. of Germany .
3719834 3/1988 Fed. Rep. of Germany .
258759 9/1926 United Kingdom .

*Primary Examiner*—Joseph M. Moy
*Attorney, Agent, or Firm*—Evenson, Wands, Edwards, Lenahan & McKeown

[57] ABSTRACT

A fuel lock as part of a venting arrangement for fuel tanks has to ensure that when the fuel tank is on its side, particularly after a lateral rotation of 270°, only a legally tolerated fuel quantity can flow out from the vent conduit. The fuel lock has an inlet chamber and an outlet chamber separated from the former by a partition and communicating with its chamber by a connecting conduit. The inlet chamber is connected to a surge tank of the fuel tank by an inlet conduit and the outlet chamber is connected to a vent conduit. In the inlet chamber, the inlet conduit and connecting conduit mouthpiece openings within the chamber and, in the outlet chamber, the connecting conduit and outlet conduit mouthpiece openings within the chamber are located relative to one another such that in the syphon conduit formed by these conduits and passing through the chambers, in each case a break point for the syphon effect is present within the chambers. The inlet conduit mouthpiece opening within the inlet chamber is located above the maximum fuel level in the tank installation attitude and in an attitude when the tank is on its side. The volume of the outlet chamber is larger than that of the inlet chamber and preferably corresponds to at least twice the volume of the outlet conduit.

4 Claims, 4 Drawing Sheets

FUEL LOCK FOR FUEL TANK VENTING ARRANGEMENT

BACKGROUND AND SUMMARY OF THE INVENTION

The present invention concerns a fuel lock as part of venting arrangement for fuel tanks, and, more particularly, to a fuel lock having a casing to which are connected both an inlet conduit connected to the inside of the tank and an outlet conduit connected to atmosphere. The inlet conduit emerges into a volume of a casing space with a mouthpiece within the space located on an axial extent of the casing space which is above the maximum fuel level in the installation attitude and also when the fuel tank is on its side.

A fuel lock is shown in DE-PS 37 19 834 and forms a vessel which is interposed between two conduit sections constituting an inlet conduit and an outlet conduit of a surge conduit led away from a surge tank to the atmosphere. The inlet and outlet conduits are located, radially offset relative to one another in a common horizontal plane and each ends in the region of one of the end walls of the vessel. This configuration is arranged such that when the tank is on its side because of an accident, the vessel is above the fuel level. Fuel running out of the outlet conduit then sucks gas from the vessel. The quantity of gas present in the vessel is dimensioned so that it is sufficient to interrupt a syphon action on the fuel produced within the vessel. This satisfies safety conditions specified by the legislative authorities with respect to the outflow of a certain quantity of fuel during a limited period of time.

In practice, however, it has been found that in the case of certain extreme (and extremely rare) driving maneuvers, so much fuel can be forced from the fuel tank into the vessel by virtue of centrifugal force via the inlet conduit, with simultaneous compression of the gas in the vessel, that in the case where, because of an accident, the vehicle is on its side immediately afterwards so that the outlet of the outlet conduit comes to rest under the fuel level, both mouthpieces from the inlet conduit and the outlet conduit within the casing are located in the fuel. Therefore, fuel can be drawn into the vessel when fuel flows out of the outlet conduit and the fuel tank can run out.

An object of the invention is to improve a fuel lock so that, even in the case of an extreme situation described above or during a simulation of possible situations where the fuel tank is on its side or upside down, a continuous outflow of fuel is prevented or, alternatively, only the quantity of fuel tolerated by legislative authorities can run out freely.

This object has been achieved according to the present invention by subdividing the casing space into an inlet chamber and an outlet chamber which are connected together by a connecting conduit. The distance between the inlet conduit mouthpiece opening within the chamber and a partition separating the two chambers from one another is smaller than the distance between the partition and the connecting conduit mouthpiece opening in the inlet chamber. The connecting conduit emerges axially in the inlet chamber which, starting from the inlet side of the partition, is smaller than the chamber axial extent corresponding to half its volume. The outlet conduit enters the outlet chamber in the region of its end wall opposite the partition. The distance of the outlet chamber end mouthpiece of the connecting conduits viewed from the partition, in the axial direction is larger than the axial extent of the outlet chamber corresponding to half it volume. The outlet end mouthpiece of the connecting conduit and the outlet conduit mouthpiece within the chamber are spaced apart by a distance in the axial direction.

The casing of the fuel lock according to the present invention, which in the installation attitude of the fuel tank is located above the maximum fuel level, has an inlet chamber and an outlet chamber into each of which two conduits laying in a common horizontal plane emerge. One of these conduits forms a connecting conduit connecting the two chambers with one another.

The inlet conduit, connecting conduit and outlet conduit mouthpieces within the chamber form two break points in series in a vent conduit formed by the three conduits. Their conduit sections within the chamber would, without the break points, form a syphon conduit formed in one of the possible attitudes where the fuel tank is on its side. A continuous outflow of fuel would commence from the syphon conduit as soon as the fuel column in the outlet conduit becomes lower or fuel emerges from this outlet conduit.

The break point provided in the outlet chamber ensures that when the fuel tank is tilted into the position on its side, a syphon effect normally occurring in the inlet chamber due to fuel flowing out of the outlet conduit is interrupted again in the outlet chamber so that a continuous outflow of fuel is reliably prevented.

BRIEF DESCRIPTION OF THE DRAWINGS

These and further objects, features and advantages of the present invention will become more apparent from the following detailed description of a currently preferred embodiment when taken in conjunction with the accompanying drawings wherein:

FIG. 1a is an enlarged cross-sectional view along Line Ia—Ia of FIG. 1;

DETAILED DESCRIPTION OF THE DRAWINGS

Figure 1:
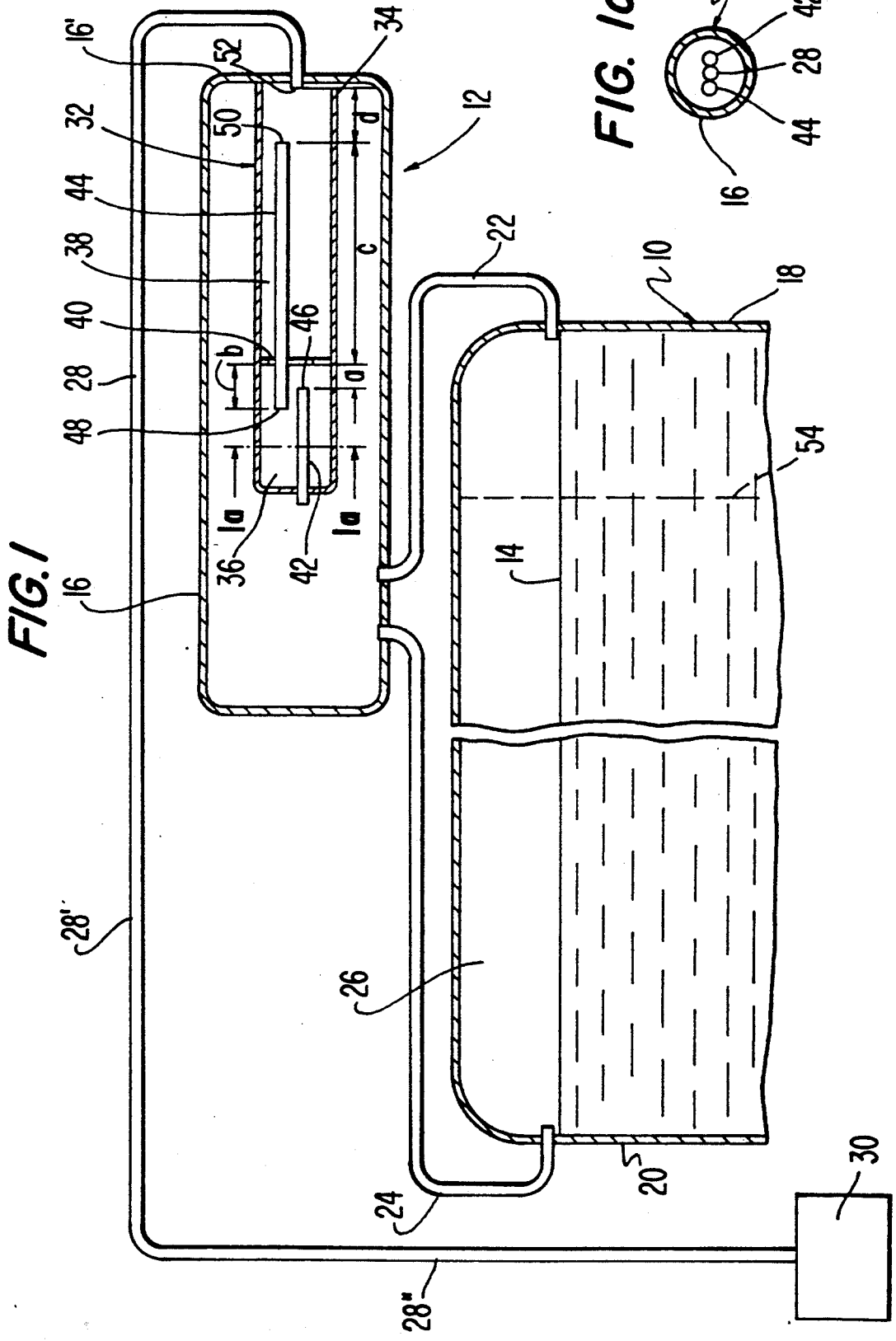
FIG. 1 is a schematic view of the fuel tank of the present invention in its installation attitude.

FIG. 1 shows a motor vehicle fuel tank designated generally by the numeral 10 in its installation attitude where the fuel tank extends transversely to a longitudinal axis of the vehicle which is at right angles to the plane of the drawing. A venting arrangement is designated generally by the numeral 12 provided outside and above the fuel tank 10 but could also be located within the tank above the maximum fuel level 14. The venting arrangement 12 has an elongated tubular surge tank 16 extending in the transverse direction of the vehicle. This surge tank 16 is connected to the fuel tank 10 by connecting conduits 22 and 24, which are each connected to a side wall 18 or 20, respectively, of the fuel tank 10 and to the part 26 of the tank space which is located above the maximum fuel level 14 and filled with a gas mixture. A vent conduit 28, referred to in the following description as the outlet conduit, leads away from the surge tank 16, preferably to an active carbon filter 30.

The outlet conduit 28 is connected to the right-hand end of the surge tank 16 with a conduit section 28' extending horizontally above the surge tank 16 in the transverse direction of the vehicle. The conduit section 28" of the outlet conduit 28 extends downwardly to the active carbon filter 30 at a lateral distance from the side wall 20 of the fuel tank 10.

A fuel lock designated generally by the numeral 32, is located within the surge tank 16, and ensures that after a total rotational motion of the fuel tank 10 of 270° about an axis located in the vehicle longitudinal direction in the case of roll-over (FIG. 4), for example in the clockwise direction, only a legally fixed maximum quantity of fuel will run out from the fuel tank 10 or the surge tank 16 via the outlet conduit 28. The fuel lock 32 has an elongated, e.g. cylindrical, casing 34 which extends into the surge tank 16 from its right-hand end wall 16' as viewed in FIG. 1. Alternatively, the fuel lock 32 could also be arranged in this way outside the end wall 16'. Instead of an arrangement coaxial with the surge tank 16, the fuel lock 32 can also be located higher in the surge tank 16.

The casing space is subdivided into two chambers in series, preferably of the same cross-section, i.e. an inlet chamber 36 and an outlet chamber 38 separated from each other by a partition 40. The volume of the outlet chamber 38 preferably corresponds to at least twice the volume of the outlet conduit 28, whereas the volume of the inlet chamber 36 corresponds to only a fraction of this volume, preferably less than half of it.

An inlet conduit 42 enters the inlet chamber 36, and the two chambers 36, 38 communicate with one another via a connecting conduit 44 passing through the partition 40. The distance a between the partition 40 and the mouthpiece opening 46 of the inlet conduit 42 within the chamber 36 is smaller than the distance b between the partition 40 and the mouthpiece opening 48 located in the inlet chamber 36. The axial extent b of the connecting conduit 44 from the partition 40 into the inlet chamber 36 is smaller than an axial extent of the inlet chamber 36 corresponding to half its volume.

The connecting conduit 44 extends axially into the outlet chamber 38, and its mouthpiece opening 50 on the outlet chamber side has a distance c which, starting from the partition 40, is larger than an axial extent of the outlet chamber 38 corresponding to half its chamber volume. The mouthpiece opening 50 at the outlet chamber end is provided at a distance d from the mouthpiece opening 52 at direction of axial extent of the connecting conduit 44.

For easier understanding of the relative arrangement of the mouthpiece openings 46 and 48 of inlet conduit 40 and connecting conduit 44 in the inlet chamber 36 and of the mouthpiece openings 50 and 52 of connecting conduit 44 and outlet conduit 28, these conduits 40, 44 and 28 are drawn in different horizontal planes in the installation attitude in FIG. 1 whereas, in reality, as can be seen from Fig. 1a, they have to be geodetically located on the same horizontal level in the installation attitude. Moreover, the arrangement of the fuel lock 32 relative to the fuel tank 10 must be such that the mouthpiece opening 46 of the inlet conduit 40 must be located above the fuel level 54 which occurs not only in the installation attitude but also in one of the possible positions where the fuel tank 10 is on its side as shown in FIG. 2.

In describing the operation of the fuel lock 32 it is assumed that possible positions of the fuel tank 10 on its side or upside down corresponding to valid test specifications are simulated in a device. A series of test attitudes are then selected for a so-called "roll-over", during which the fuel lock 32 is brought in sequence into three test attitudes, relative to its specific arrangement on the fuel tank 10, differing from one another in each case by 90°, with the fuel tank 10 being rotated to the right.

Figure 2:
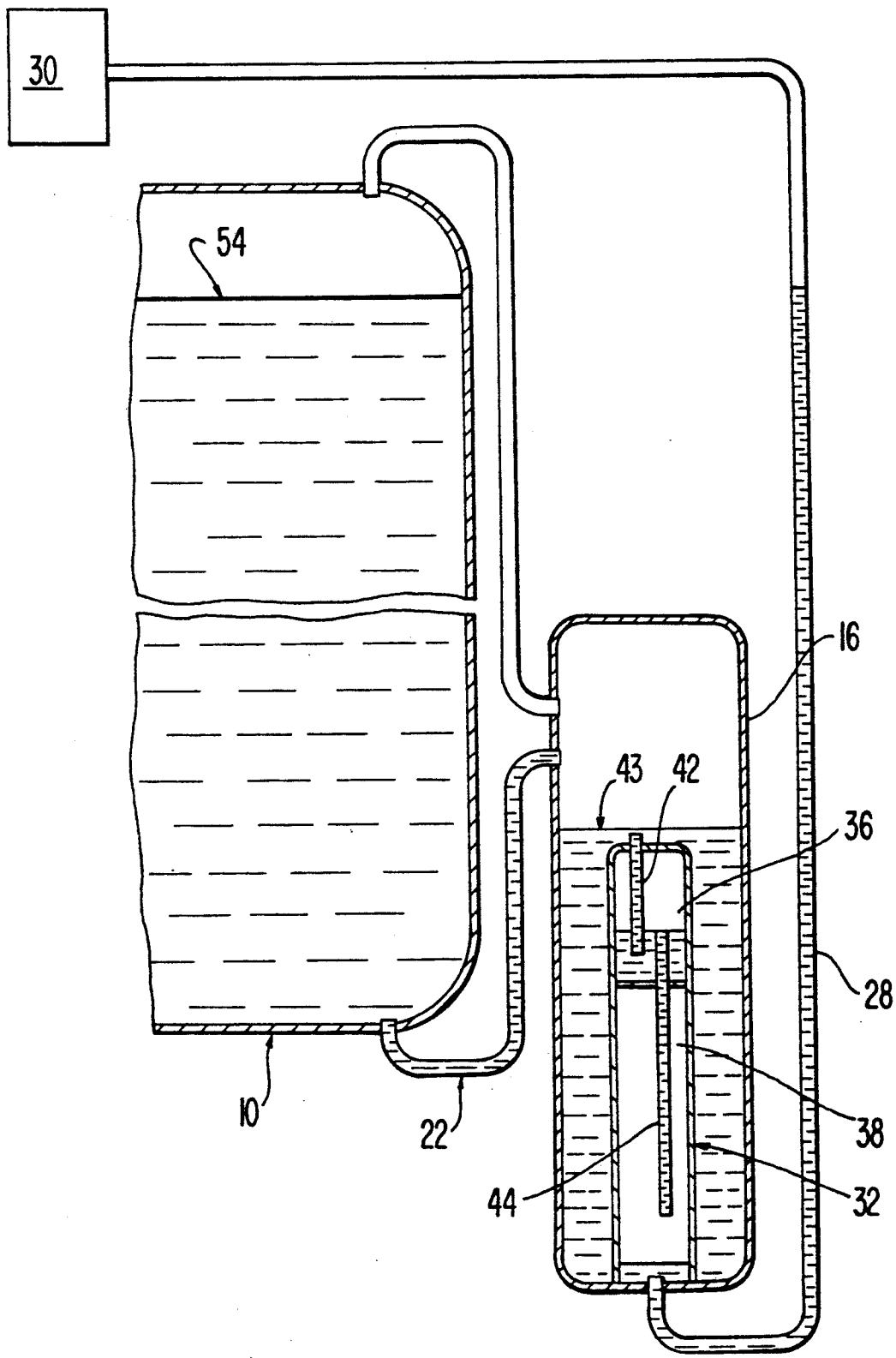
FIG. 2 shows the fuel tank of FIG. 1 in a position where it is tilted to the right onto its side.

If the fuel tank 10 takes up a first test attitude, i.e. on its side as shown in FIG. 2, fuel flows via the connecting conduit 22 into the surge tank 16 in which a fuel level 43 will appear. Fuel flows from the surge tank 16 via the inlet conduit 42 into the inlet chamber 36, from there via the connecting conduit 44 into the outlet chamber 38 and from the connecting chamber 38, finally, into the outlet conduit 28. In the outlet conduit 28, the fuel rises to the height of the fuel level 54 appearing in the fuel tank 10. Fuel cannot, therefore, escape from the outlet conduit 28.

Figure 3:
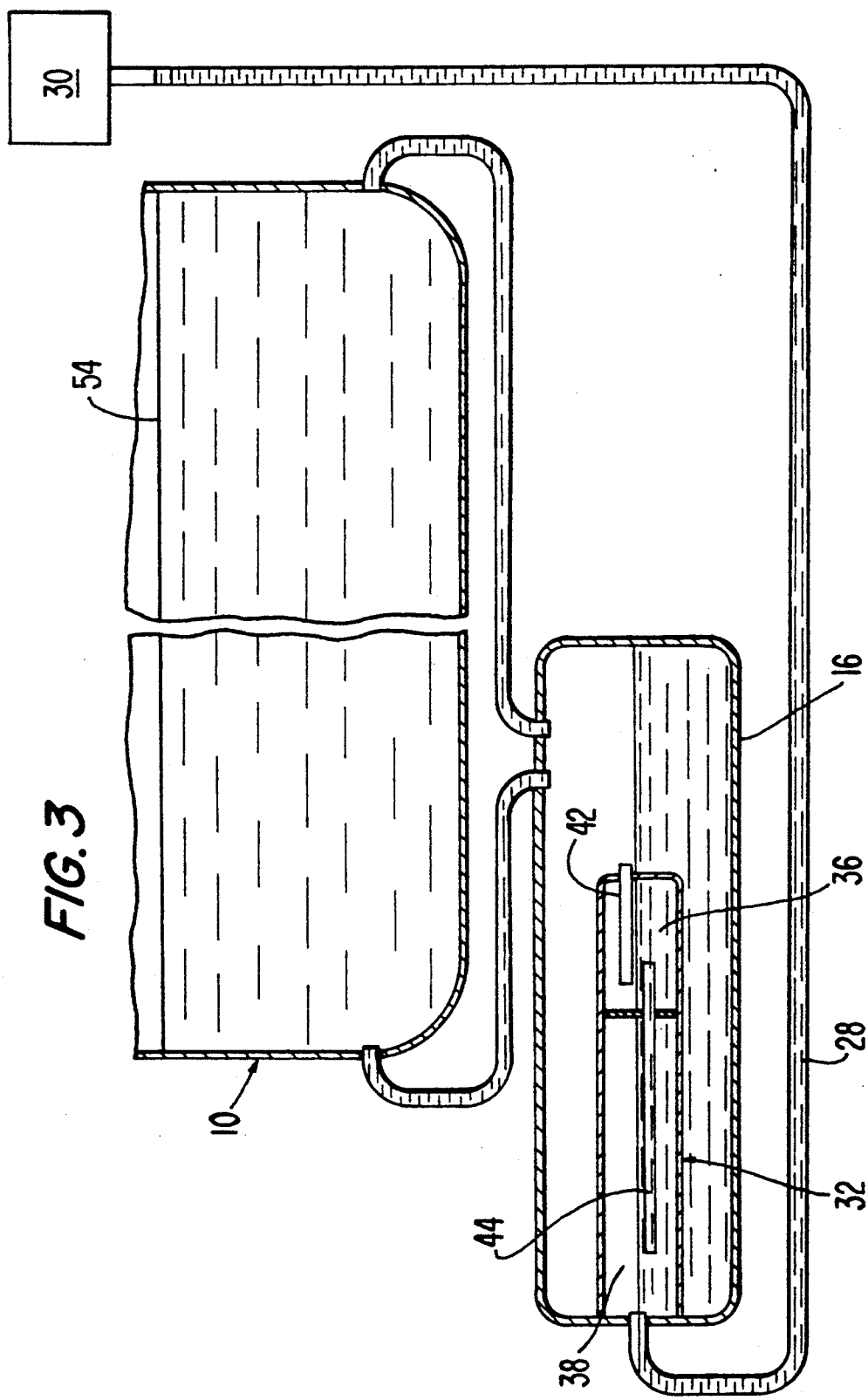
FIG. 3 shows the fuel tank of FIG. 1 upside down.

In the attitude where the fuel tank 10 is upside down, as shown in FIG. 3, the surge tank 16 and the inlet chamber 36 and outlet chamber 38 of the fuel lock 32 fill with fuel via the inlet and connecting conduits 42, 44 located on the same geodetic level as seen in Fig. 1a as the axis of the surge tank 16. The fuel will simultaneously fill the outlet conduit 28 up to the height of the fuel level 54 appearing in the fuel tank 10. Again, therefore, fuel does not emerge from the outlet conduit 28.

Figure 4:
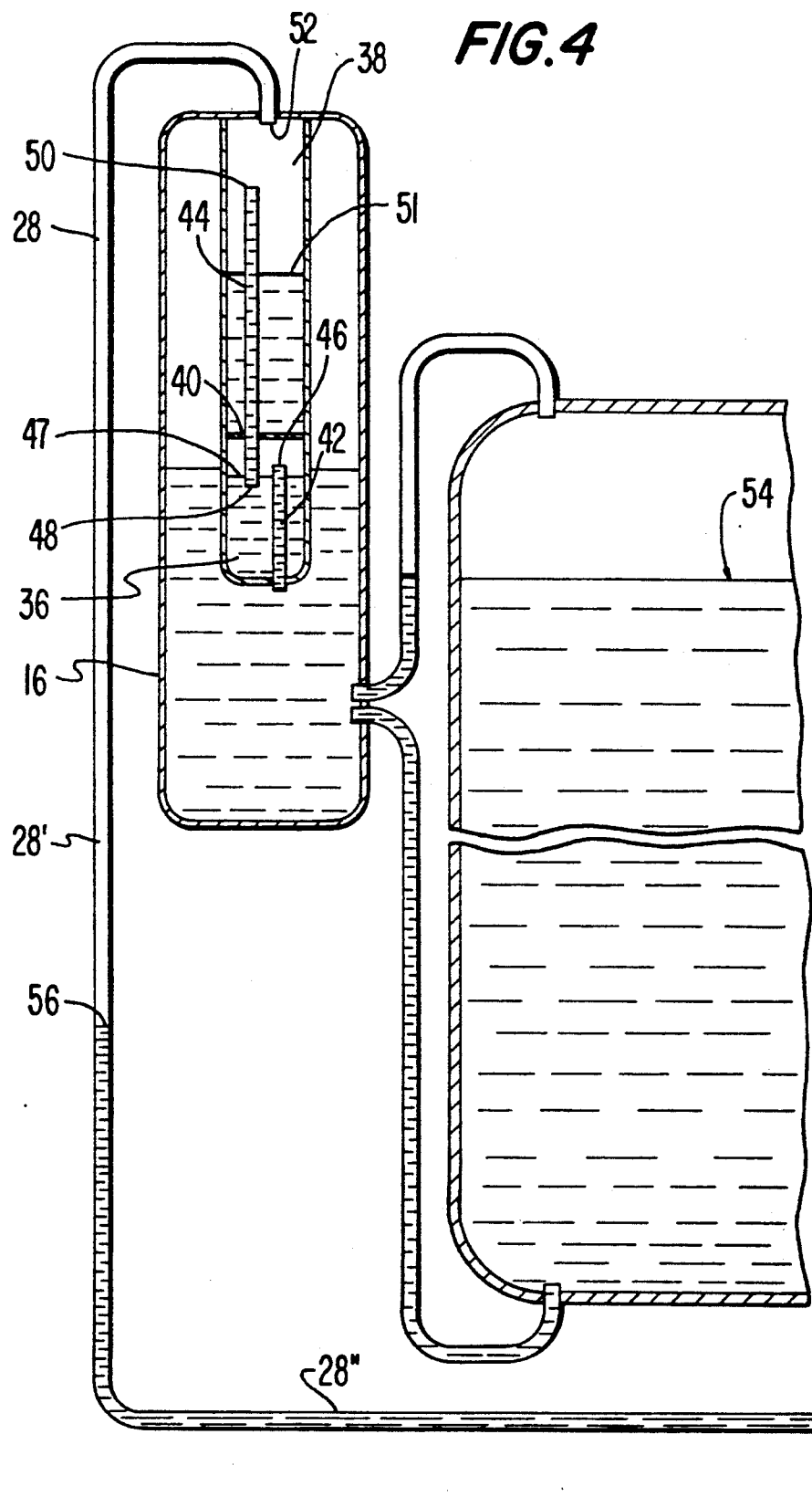
FIG. 4 shows the fuel tank on its side after it has rolled over to the right by 270°.

In the 270° roll-over position with the tank on its side shown in FIG. 4, the connecting conduit 44 mouthpiece opening 48 is located below the fuel level 47 in the inlet chamber 36 whereas the inlet conduit 42 mouthpiece opening 46 in the inlet chamber 36 is located above the fuel level 47. The mouthpiece opening 50 of the connecting conduit 44 in the outlet chamber 38 is located above the fuel level 51 within the chamber. In a similar manner to the installation attitude, the end of the outlet conduit 28 or the active carbon filter 30 is again, in this test attitude, in a plane under the fuel level 54.

The fuel which flowed into the outlet conduit 28 in the two preceding test attitudes (FIGS. 3 and 4) flows downwards into the outlet conduit 28 under the influence of gravity so that a depression is generated in the outlet chamber 38 and out of this, gas from the gas volume present is sucked into the outlet conduit 28. The outlet chamber 38 simultaneously fills with fuel sucked from the inlet chamber 36 via the connecting conduit 44, an additional consequence of which being a flow of fuel via the inlet conduit 42 from the surge tank 16 into the inlet chamber 36.

The fuel column in the conduit section 28' of the outlet conduit 28 will then fall until such times as the magnitude of the liquid pressure generated by it corresponds to the magnitude of the depression present in the outlet chamber 38.

The volumes of the outlet chamber 38 and the outlet conduit 28 are matched to one another such that, when an equilibrium is reached between the hydrostatic pressure and the depression, the fuel column comes to rest at 56 when still in the conduit section 28' so that the fuel level 51 in the outlet chamber 38 still remains under the mouthpiece opening 50 of the connecting conduit. If the break point provided by the distance d between the connecting conduit mouthpiece opening 50 and the outlet conduit 28 mouthpiece opening 52 were not present in the outlet chamber 38, the fuel tank 10 would empty completely in this test attitude.

The fuel lock 32, including the inlet and connecting conduits 42 and 44, can be injection-molded in one piece as a plastic molding. Both the conduits 42, 44 can be molded on outside the casing of the fuel lock 32.

A particular advantage is achieved by the present invention in the case where an appropriate recess is formed at the top in the fuel tank to permit, for example, long objects such as skis to be passed through from the luggage compartment into the rear-seat area. Then, it is necessary to accommodate the venting arrangement on one side of the fuel tank. Because of its compact design, the fuel lock according to the present invention permits such a configuration.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A fuel lock as part of a venting arrangement for a fuel tank, comprising a casing to which are connected both an inlet conduit connected to the inside of the tank and an outlet conduit connected to atmosphere, the inlet conduit emerging into a volume of a casing space and having a mouthpiece within the space located on an axial extent of the casing space which is above a maximum fuel level in an installation attitude of the fuel tank and also when the tank is on its side, the axial extent of the casing space being greater than the axial extent corresponding to half its volume and the inlet conduit and the outlet conduit being located on the same horizontal level in an initial horizontal casing attitude, wherein the casing space is subdivided into an inlet chamber and an outlet chamber connected together by a connecting conduit, a distance between a mouthpiece opening of the inlet conduit within the inlet chamber and a partition separating the inlet and outlet chambers from one another is smaller than a distance between the partition and a mouthpiece opening of the connecting conduit in the inlet chamber, the connecting conduit emerging in an axial extent in the inlet chamber which, starting from an inlet side of the partition, is smaller than the chamber axial extent corresponding to half its volume, the outlet conduit entering the outlet chamber in a region of an end wall thereof opposite to the partition, and the distance of the outlet chamber end mouthpiece of the connecting conduit, as viewed from the partition, has an extent in the axial direction which is larger than the axial extent of the outlet chamber corresponding to half its volume, and the outlet end mouthpiece of the connecting conduit and the outlet conduit mouthpiece within the chamber are spaced by a distance in the direction of axial extent.

2. The fuel lock according to claim 1, wherein the volume of the outlet chamber corresponds to at least twice the volume of the outlet conduit.

3. The fuel lock according to claim 1, wherein a surge tank includes the fuel lock.

4. The fuel lock according to claim 1, wherein the fuel lock is a plastic preform.

* * * * *